United States Patent [19]
Jäckel et al.

[11] Patent Number: 5,257,715
[45] Date of Patent: Nov. 2, 1993

[54] METHOD OF MAKING BRAKE BANDS

[75] Inventors: Johann Jäckel, Baden-Baden; Heinz Molt, Heiningen, both of Fed. Rep. of Germany

[73] Assignee: Luk Lamellen Und Kupplungsbau GmbH, Buhl, Fed. Rep. of Germany

[21] Appl. No.: 952,582

[22] Filed: Sep. 28, 1992

[30] Foreign Application Priority Data

Sep. 28, 1991 [DE] Fed. Rep. of Germany ....... 4132421
May 26, 1992 [DE] Fed. Rep. of Germany ....... 4217358

[51] Int. Cl.$^5$ .............................................. B23K 31/02
[52] U.S. Cl. .................... 228/135; 228/173.6; 228/213; 228/17.5; 29/428
[58] Field of Search .................. 228/135, 170, 173.1, 228/173.6, 182, 185, 212, 213, 17.5; 29/418, 428

[56] References Cited

U.S. PATENT DOCUMENTS

| | | | |
|---|---|---|---|
| 3,719,984 | 3/1973 | Frishof | 228/173.6 |
| 3,893,225 | 7/1975 | Hamrick et al. | 228/173.6 |
| 4,406,394 | 9/1983 | Nels | 228/170 |
| 4,603,706 | 7/1986 | Blinks | 188/259 |

Primary Examiner—Samuel M. Heinrich
Attorney, Agent, or Firm—Darby & Darby

[57] ABSTRACT

The metallic portion of a multiple wrap brake band for use in automatic transmissions of motor vehicles is obtained by deforming a circular metallic blank at right angles to its plane into a cup-shaped preform. The bottom wall of the preform is separated from the annular wall and the annular wall is thinned, calibrated, cut, slotted and provided with actuating elements as well as slitted in the circumferential direction to form several neighboring wraps of the multiple wrap brake band. A prefabricated split ring-shaped brake lining is bonded to the internal surface of the annular wall prior to the formation of wraps.

48 Claims, 1 Drawing Sheet

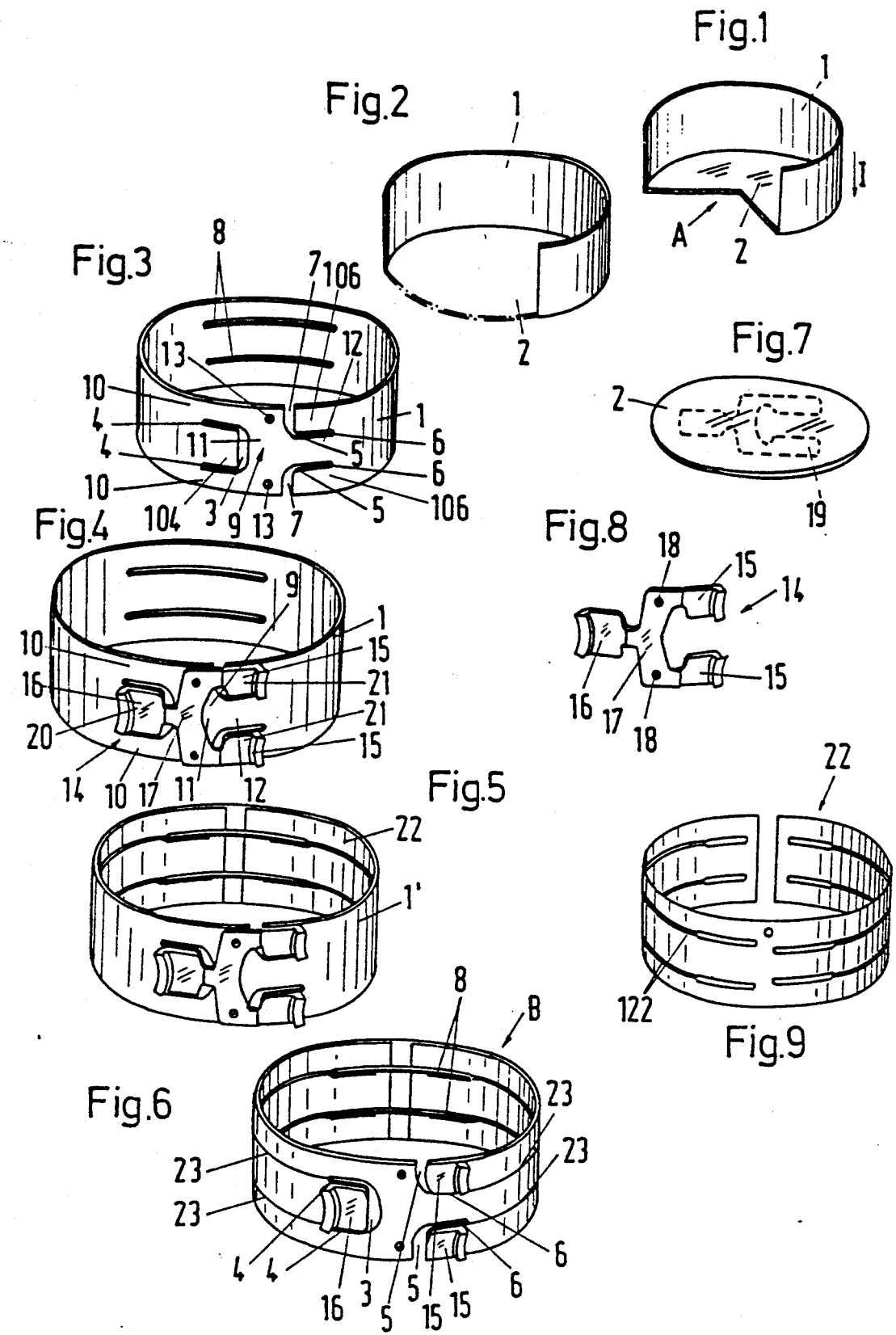

METHOD OF MAKING BRAKE BANDS

CROSS-REFERENCE TO RELATED CASE

A brake band similar to that which can be produced in accordance with the method of the present invention is disclosed in commonly owned copending patent application Ser. No. 07/952,568 filed Sep. 28, 1992 by Heiner Willerscheid et al. for "Friction generating device and method of making the same".

BACKGROUND OF THE INVENTION

The invention relates to brake bands in general, and more particularly to improvements in methods of making brake bands.

U.S. Pat. No. 4,602,706 granted Jul. 29, 1986 to John C. Blinks et al. for "Double wrap brake band" discloses a brake band for use in automatic transmissions of motor vehicles. Such brake bands can be utilized with advantage in automatic transmissions of the torque converter type wherein a driven shaft extends from the torque converter into the transmission to a unit having one or more clutch drums. Double wrap brake bands are placed around such drums and performs the function of effecting gear changes and of controlling the direction of rotation of the output shaft of the transmission. The disclosure of the patent to Blinks et al. is incorporated herein by reference.

OBJECTS OF THE INVENTION

An object of the invention is to provide a novel and improved method of making brake bands.

Another object of the invention is to provide a novel and improved method of making multiple wrap brake bands.

A further object of the invention is to provide a simple and inexpensive method of making selected portions of brake bands.

An additional object of the invention is to provide a method which renders it possible to turn out brake bands with a high degree of accuracy at a reasonable cost.

Still another object of the invention is to provide a novel and improved method of converting a simple circular blank into the metallic portion of a brake band.

A further object of the invention is to provide a method of making brake bands with considerable savings in metallic and other materials.

Another object of the invention is to provide a method of making reliable and long-lasting brake bands.

An additional object of the invention is to provide a novel and improved method of making the metallic constituents of a brake band.

A further object of the invention is to provide a brake band which is produced in accordance with the above outlined method.

Another object of the invention is to provide a double wrap brake band for use in automatic transmissions of motor vehicles.

An additional object of the invention is to provide a transmission which utilizes one or more brake bands produced in accordance with the above outlined method.

Still another object of the invention is to provide a novel and improved method of assembling and processing the metallic portion and the brake lining of a multiple wrap brake band.

A further object of the invention is to provide a novel and improved method of converting an annular body of metallic material into the metallic portion of a multiple wrap brake band.

Another object of the invention is to provide a method which can be practiced by resorting to available machines.

An additional object of the invention is to provide a novel and improved method of bonding metallic constituents of a multiple wrap brake band to each other.

Still another object of the invention is to provide a method which renders it possible to reduce the percentage of scrap and to simultaneously perform several different steps in converting one or more blanks into the metallic portion of a multiple wrap brake band.

SUMMARY OF THE INVENTION

One feature of the present invention resides in the provision of a method of making a tubular portion of a brake band. The method comprises the steps of locating a blank of sheet steel in a predetermined plane, and deforming the thus located blank in a direction at right angles to the plane.

The deforming step can comprise deep drawing or extruding the blank. The deforming step can involve a cold forming operation.

In accordance with a presently preferred embodiment of the method, the deforming step includes converting the blank into a cup-shaped preform with an annular wall and a bottom wall, and transforming the preform into the tubular portion including separating the bottom wall from the annular wall. Such method can further comprise the step of cutting the blank out of a web of sheet steel which can be used for the making of two or more blanks, and the transforming step can further comprise imparting to the annular wall a predetermined thickness.

The method can further comprise the step of calibrating the tubular portion from within, and such calibrating step can take place simultaneously with the deforming step.

The bottom wall of the cup-shaped preform is initially of one piece with one axial end of the annular wall, and the method then further comprises separating the bottom wall from the one axial end of the annular wall. The annular wall can be subjected to calibration upon completion of the separating step.

Alternatively, the calibrating step can be carried out simultaneously with the separating step.

The annular wall can be transformed into a portion of a multiple wrap brake band upon separation of the bottom wall, and the step of transforming the annular wall into a portion of a multiple wrap brake band can include providing the annular wall with substantially radially extending cuts preferably including a substantially U-shaped first cut and two substantially L-shaped second cuts. Each second cut has a first leg extending axially of the annular wall and a second leg extending circumferentially of the annular wall. The first legs of such L-shaped cuts each extend all the way to a different one of the two axial ends of the annular wall, i.e., the first leg of one L-shaped cut extends from one axial end toward but short of the other axial end of the annular wall, and the first leg of the other L-shaped cut extends from the other axial end toward but short of the one axial end of the annular wall. Such first legs can be aligned with each other in the axial direction of the annular wall. The second legs of the two L-shaped cuts extend in a direction away from the U-shaped cut.

The step of transforming the annular wall into a portion of a multiple wrap brake band can further comprise providing the annular wall with circumferentially extending first slots which are preferably disposed substantially diametrically opposite the cuts. Still further, such transforming step can include providing the annular wall with additional circumferentially extending slots between the cuts and the circumferentially extending first slots.

The deforming step of the method can comprise converting the blank into a preform (e.g., into the aforementioned cup-shaped preform) with an annular wall having first and second axial ends, and trimming at least one axial end of the annular wall (e.g., simultaneously with or as a result of separation of the bottom wall of the cup-shaped preform). The trimming step can include radial stamping or punching of the annular wall at the at least one axial end. The step of providing the annular wall with one or more first and/or second circumferentially extending slots can be carried out simultaneously with the stamping or punching step, i.e., simultaneously with trimming of the at least one axial end of the annular wall.

The deforming step can comprise converting the blank into a preform (for example but not necessarily into the aforediscussed cup-shaped preform) with an annular wall, and providing the annular wall with a substantially U-shaped first cut and with two substantially L-shaped second cuts defining with the first cut a substantially Y-shaped portion of the annular wall. The substantially Y-shaped portion has two first arms extending circumferentially of the annular wall and flanking the first cut; a web connecting the first arms, disposed between the first cut and the second cuts, and extending substantially axially of the annular wall; and a third arm extending from the web circumferentially of the annular wall between the second cuts and away from the first arms. The method can further comprise the step of providing the web of the Y-shaped portion of the annular wall with one or more locating openings and/or with one or more locating protuberances, i.e., with one or more female and/or male locating members.

The U-shaped first cut can be configurated to provide the annular wall with a first circumferentially extending tongue, and each of the two L-shaped cuts can be configurated to provide the annular wall with two additional tongues which confront the first tongue and also extend in the circumferential direction of the annular wall. The tongues can be used for attachment of actuating elements of the multiple wrap brake band. Such method can further comprise the steps of forming a substantially Y-shaped one-piece composite actuating element and affixing the composite actuating element to the tongues of the annular wall. The step of forming the composite actuating element can include shaping a blank of metallic sheet material, preferably in such a way that the composite actuating element is provided with two spaced-apart first arms, with a web which connects the first arms to each other, and with a third arm which extends from the web away from the first arms. The affixing step of such method includes securing each arm of the composite actuating element to a discrete tongue of the annular wall. The web of the Y-shaped composite actuating element can be provided with one or more male locating members (e.g., in the form of protuberances) and/or with one or more female locating members (e.g., in the form of openings) which cooperate with and are complementary to the aforediscussed female or male locating members on the web of the Y-shaped portion of the annular wall to properly position the arms of the Y-shaped composite actuating element relative to the tongues of the annular wall.

The arms of the composite actuating element can be welded or soldered to the tongues of the annular wall. The method can comprise the step of providing the arms of the composite actuating element with suitable projections (e.g., with substantially honeycomb-shaped or triangular projections) which are affixed (preferably welded or soldered) to the tongues of the annular wall. The affixing step can comprise bonding at least 25 percent of the composite actuating element to the annular wall. In accordance with a presently preferred embodiment of the method, the bonding step which is carried out to affix the arms of the composite actuating element to the tongues of the annular wall can include so-called stored energy welding of the composite actuating element to the annular wall.

The aforementioned step of forming a composite actuating element can include obtaining such actuating element from the bottom wall of the cup-shaped preform which is obtained as a result of deformation of the initial blank.

The method can further comprise the step of applying a brake lining to the internal surface of the annular wall. The thus obtained multi-layer structure can be converted into a portion of a multiple wrap brake band by providing the annular wall and the brake lining with slots extending circumferentially of the annular wall.

The deforming step can comprise converting the blank into a preform with an annular wall, and the method can further comprise the step of transforming the annular wall into a portion of a double wrap brake band. The transforming step can include slitting the annular wall between the wraps of the portion of the double wrap brake band. The slitting step can comprise severing the annular wall with at least one beam of corpuscular radiation. The transforming step can further comprise providing the annular wall with the aforementioned U-shaped and L-shaped cuts, and the severing step of such method can comprise severing the annular wall between one leg of the U-shaped cut and the circumferentially extending leg of one of the two L-shaped cuts as well as between the other leg of the U-shaped cut and the circumferentially extending leg of the other L-shaped cut. The aforediscussed step of providing the annular wall with circumferentially extending first and/or second slots can be carried out prior to the severing step, and the severing step can comprise lengthening the slots in the circumferential direction of the annular wall so that one of the lengthened slots extends all the way between one leg of the U-shaped cut and the circumferentially extending leg of one of the L-shaped cuts and another of the lengthened slots extends all the way between the other leg of the U-shaped cut and the circumferentially extending leg of the other L-shaped cut.

The method of making a portion of a multiple wrap brake band can further comprise separating the web of the aforediscussed Y-shaped composite actuating element from its arms subsequent to affixing (such as welding or soldering) of the arms of the composite actuating element to the respective tongues of the annular wall. The separating step can include separating the web of the composite actuating element by punching or stamping or by severing the composite actuating element with one or more beams of corpuscular radiation to separate the web of such composite actuating element from its arms. Prior to its separation from the arms, the web of the composite actuating element is located between the legs of the U-shaped cut and the legs of the L-shaped cuts in the annular wall.

Another feature of the invention resides in the provision of a method of making a portion of a multiple wrap brake band. The method comprises the steps of forming an annular wall of metallic material and slitting the annular wall in the circumferential direction to form a plurality of neighboring wraps with slits between the neighboring wraps.

The novel features which are considered as characteristic of the invention are set forth in particular in the appended claims. The improved method itself, however, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a fragmentary perspective view of a cup-shaped preform which is obtained from a flat blank as a result of deformation of the blank in a punching, stamping, extruding or like machine;

FIG. 2 is a fragmentary perspective view of the annular wall of the cup-shaped preform subsequent to its separation from the bottom wall of the preform;

FIG. 3 is a perspective view of the separated annular wall subsequent to the provision of a U-shaped cut and two L-shaped cuts therein.

FIG. 4 is a perspective view of the annular wall and of a composite actuating element whose arms are bonded to the tongues defined by the cuts in the annular wall;

FIG. 5 is a perspective view of the structure of FIG. 4 and further showing a brake lining which is applied to the internal surface of the annular wall;

FIG. 6 is a perspective view of the finished multiple wrap brake band with three discrete actuating elements obtained as a result of separation of the web of the composite actuating element from its arms;

FIG. 7 is a perspective view of the separated bottom wall of the preform, the outline of the Y-shaped composite actuating element which can be cut out of the separated bottom wall being indicated by broken lines;

FIG. 8 is a perspective view of the composite actuating element prior to its bonding to the annular wall; and FIG. 9 is a perspective view of the brake lining prior to its application to the internal surface of the annular wall.

DESCRIPTION OF PREFERRED EMBODIMENTS

The method of the present invention can be resorted to for the making of a tubular portion of or an entire brake band. The first step involves deformation of a plane circular blank (not shown) into a cup-shaped preform A having an annular wall 1 one axial end of which is of one piece with a disc-shaped bottom wall or end wall 2. The blank can constitute a plate or a coil of sheet steel, and such plate or coil can be used for the making of two, three or a much larger number of discrete blanks each of which is converted into a cup-shaped preform A in a suitable stamping, extruding, punching or other machine, not shown. The step of separating one or more circular blanks from the plate or coil can include or constitute a cutting, stamping, punching or another suitable operation. The deforming step which is carried out to transform the blank into a preform A can include deep drawing and/or forming under a combination of tensile and compressive conditions. Such treatment normally leaves the thickness of the bottom wall 2 unchanged but the thickness of the annular wall 1 normally increases, i.e., the thickness of the annular wall exceeds the thickness of the initial circular blank. Furthermore, the density and hence the basic strength of the material of the annular wall 1 increases as a result of conversion of the marginal portion of a plane circular blank into a normally cylindrical sidewall of the preform A. It is equally within the purview of the invention to deform a blank into the preform A by resorting exclusively to forming under compressive conditions, for example, by extrusion. Irrespective of the selected deforming step, it is presently preferred to make the preform A by cold forming in order to achieve a corresponding strengthening of the starting material, such as sheet steel.

A further step involves reducing the thickness of the wall 1 to a desired or optimal thickness by resorting to a suitable drawing, stretching or other machine. Such thickness reducing step is or can be carried out with a high degree of accuracy so that one can dispense (at least in many instances) with a discrete calibrating step. The thickness reducing step exhibits the additional advantage that it further strengthens the material of the annular wall 1. The annular wall 1 of the preform A of FIG. 2 is assumed to have been subjected to the thickness reducing step. The position of the bottom wall 2 is indicated in FIG. 2 by phantom lines because the bottom wall is assumed to have been severed from the annular wall 1 with attendant simultaneous trimming of the respective axial end of the annular wall. The separated bottom wall 2 is shown in FIG. 7. Though it is possible to discard the separated bottom wall 2, the inventors presently prefer to utilize this bottom wall for the making of a specially designed one-piece Y-shaped composite apply or actuating element 14 which is shown in FIG. 8 and can be used to complete the making of a multiple wrap brake band B of the type shown in FIG. 6. Thus, the bottom wall 2 is recovered from the stamping, punching or other machine or from the severing tool or tools of such machine in order to employ the recovered bottom wall as a blank for the making of at least one composite apply or actuating element 14.

Separation of the bottom wall 2 from the annular wall 1 of the preform A and the reduction of thickness of the separated wall 1 to a desired optimum value can be followed (if necessary) by a calibrating step, especially if the inner diameter of the wall 1 is to match a desired optimum value with an extremely high degree of accuracy. As already stated hereinbefore, it often suffices to carry out the thickness reducing step with a sufficiently high degree of accuracy so that calibration of the thus treated wall 1 is not necessary.

FIG. 3 shows that the separated and additionally treated annular wall 1 has been subjected to a treatment forming part of transformation of the wall 1 into a portion of the multiple wrap brake band B which is shown in FIG. 6. The additional treatment involved providing the annular wall with a U-shaped cut 3 and with two L-shaped cuts 5 which are mirror images of each other and are adjacent to but still spaced apart from the cut 3. The cuts 3 and 5 are preferably made in such a way that the tool or tools which are used for such purpose penetrate into the internal surface of the annular wall 1 and cut the wall radially outwardly all the way to the external surface.

The cut 3 has two at least substantially parallel legs 4 which extend in the circumferential direction of the wall 1 away from the L-shaped cuts 5, and an axially parallel leg which extends between the right-hand ends of the legs 4. That part of the wall 1 which is flanked by the legs 4 of the U-shaped cut 3 constitutes a tongue 104 which extends circumferentially of the wall 1 and is located substantially midway between the axial ends of such wall. Each of the L-shaped cuts 5 has a first leg 7 which extends in substantial parallelism with the axis of the annular wall from one axial end toward but short of the other axial end, and a second leg 6 which extends circumferentially of the wall 1. Each of the two legs 7 extends all the way to a different one of the two axial ends of the wall 1. The legs 6, 7 of the two L-shaped cuts 5 surround two additional tongues 106 which extend in the circumferential direction of the wall 1 and each of which is adjacent the respective axial end of such wall. The legs 7 of the two cuts 5 are or can be aligned with each other, i.e., they can be located in a common plane which includes the axis of the annular wall 1.

The making of the cuts 3, 5 and 5 results in the formation of a substantially Y-shaped portion 9 which is an integral part of the annular wall 1 and includes two circumferentially extending arms 10 flanking the cut 3, a third arm 12 which is flanked by the legs 6 of the two L-shaped cuts 5, and a substantially axially parallel web 11 which connects the right-hand ends of the legs 10 (as viewed in FIG. 3) with the left-hand end of the leg 12. The illustrated web 11 is provided with two spaced apart locating members 13 each of which can constitute a female or a male locating member. For example, if the locating members 13 have openings, they can be termed female locating members; however, each such opening can be surrounded by an annular border or protuberance which can be said to constitute a male locating member.

The just discussed cutting operation can further include the making of a plurality of circumferentially extending (first) slots 8 in that portion of the annular wall 1 which is located substantially diametrically opposite the cuts 3, 5 and 5, i.e., substantially diametrically opposite the Y-shaped portion 9 of the annular wall. Each of the two arcuate slots 8 can be coplanar or at least nearly coplanar with a different circumferentially extending leg 4 of the U-shaped cut 3 and with one of the circumferentially extending legs 6. It will be noted that the legs 6 of the cuts 5 extend away from the web 11 in a first direction (as seen circumferentially of the annular wall 1), and that the legs 4 of the cut 3 extend from the web 11 in the opposite direction.

The two locating members 13 of the web 11 are aligned with the two arms 10 of the Y-shaped portion 9, as seen in the circumferential direction of the annular wall 1. The width of the axially parallel legs 7 of the L-shaped cuts 5 can exceed the width of the circumferentially extending legs 6 and, as already mentioned above, each of the legs 7 extends all the way into the respective axial end of the annular wall 1.

The broken lines 19 denote in FIG. 7 that portion of the separated bottom wall (blank) 2 which is to be separated from the bottom wall in order to form the one-piece composite Y-shaped apply or actuating element 14 of FIG. 8. Separation of the portion 19 from the bottom wall 2 can take place in a suitable stamping, punching or other machine. The step of transforming or converting the portion 19 of the separated bottom wall or blank 2 into the Y-shaped composite actuating element 14 can be carried out in one, two or more successive or simultaneous stages. The finished composite actuating element 14 comprises a first discrete actuating or apply element in the form of an arm 16 at one side and two additional discrete actuating or apply elements in the form of arms 15 at the other side of a web 17 which connects one end of the arm 16 with one end of each of the arms 15. The web 17 extends transversely of the arms 15, 15 and 16 and is provided with two spaced apart locating members 18 complementary to the locating members 13 on the web 12 of the Y-shaped portion 9 of the annular wall 1. Each of the locating members 18 can constitute a female locating member by being provided with an opening (e.g., a hole) for the protuberance of the respective locating member 13, or a male locating member by constituting or including a protuberance receivable in the opening of the corresponding locating member 13. The finished composite apply or actuating element 14 can be said to resemble a tuning fork.

The purpose of the complementary locating members 13 and 18 on the respective webs 12 and 17 is to ensure highly predictable and accurate positioning of the Y-shaped composite actuating element 14 against the external surface of the Y-shaped portion 9 of the annular wall 1. At such time, the arm 16 of the element 14 overlies the tongue 104, and each of the arms 15 overlies one of the tongues 104. It is preferred to provide at least one side of each of the arms 15 and 16 with a rather large number of projections (not specifically shown), e.g., welding warts in the form of substantially honeycomb shaped projections, which abut the external surfaces of the respective tongues 104 and 106 and are affixed thereto in any one of a number of suitable ways, preferably by bonding. The bonding operation can involve welding or soldering the projections or warts of each of the arms 15, 16 to the respective tongues 104, 106. Instead of resembling honeycombs, the projections or warts on the arms 15, 16 can resemble equilateral triangles and can be obtained by flow forming, embossing or in any other suitable way. The tips of the projections can but need not be flattened prior to bonding them to the respective tongues 104, 106 of the Y-shaped portion 9 of the annular wall 1. It is also possible to provide the arms 15 and 16 with rib-shaped and/or box-shaped projections. The other side of each of the arms 15, 16 can remain undeformed, i.e., substantially flat, in order to ensure that the welding energy can be applied over a large area of each arm of the element 14 when the latter is bonded to the portion 9 of the annular wall 1. Such configuration of the arms 15, 16 is particularly advantageous if the bonding of these arms to the tongues 104, 106 involves the utilization of a so-called stored-energy (capacitor discharge) welding machine. The welding operation with such machine entails the discharge of several capacitors in response to a reduction of the distance between the workpiece (14) and the capacitors; this generates large amounts of heat which is required to weld the projections to the respective tongues 104 and 106. The heat causes the projections to melt and to be reliably bonded to the respective tongues 104, 106.

The arms 15, 16 are pressed against the respective tongues 104, 106 until the molten material sets to thus ensure the establishment of a highly reliable bond between the element 14 and the annular wall 1. It has been found that the just described bonding technique is particularly suitable in connection with affixing of the element 14 to the wall 1 because it ensures high concentration of heat at the arms 15, 16 while simultaneously ensuring that the amount of dissipated heat is very small.

FIG. 4 illustrates the element 14 upon completion of the bonding step. The two webs 9 and 17 overlie and are properly positioned relative to each other by their respective complementary locating members 13 and 18. The arms 15 of the element 14 are mirror images of the arms 10 of the portion 9, and the arm 16 is a mirror image of the arm 12. The arms 15 are bonded to the tongues 106, and the arm 16 is bonded to the tongue 104. The welded portion of the arm 16 is indicated at 20, and the welded portions of the arms 16 are indicated at 21.

FIG. 9 shows a prefabricated brake lining 22 which resembles a split ring and has circumferentially extending slots 122 having portions of greater and lesser width. The mutual spacing of the slots 122 corresponds to that of the slots 8 in the annular wall 1. The brake lining 22 is inserted into the annular wall 1 of FIG. 4 (see FIG. 5) and is bonded or otherwise affixed to the internal surface of such wall. The affixing of the brake lining 22 to the internal surface of the annular wall 1 can be carried out by resorting to a suitable adhesive.

The thus obtained tubular portion 1' of a multiple wrap brake band is then subjected to additional treatment to convert it into the band B of FIG. 6. Such additional treatment involves slitting of the annular wall 1 and (if necessary) of the brake lining 22 along the lines 23 which denote extensions of the slots 8 and can be said to constitute additional slots. One such additional slot 23 extends from one leg 4 of the cut 3 circumferentially of the annular wall 1 and all the way to the leg 6 of one of the cuts 5, and the other additional slot 23 extends from the other leg 4 of the cut 3 circumferentially of the wall 1 and all the way to the leg 6 of the other cut 5. This results in the making of a plurality of neighboring wraps which form part of the thus obtained multiple wrap brake band B and enables such brake band to expand or contract relative to a brake drum, not shown. Reference may be had to the aforementioned patent to Blinks et al.

Each slot 23 can be said to constitute an extension of the respective slot 8, both in a direction toward the cut 3 as well as in a direction toward the respective cut 5.

FIG. 6 further shows that the web 17 of the composite apply or actuating element 14 has been removed, i.e., that each of the arms 15, 16 of the composite element 14 constitutes a discrete apply or actuating element which is affixed to the respective tongue of the annular wall 1. Separation or severing of the web 17 from the arms or discrete actuating elements 15, 16 of the composite element 14 is preferably carried out by resorting to one or more beams of corpuscular radiation, the same as the making of additional slots 23. For example, the slotting and severing operations can be carried out by resorting to one or more laser beams or to one or more electron beams.

A further step of completing the making of the multiple wrap brake band B includes removal of those portions of the brake lining 22 which would or could interfere with sliding movements of neighboring wraps of the brake band B relative to each other. Such neighboring wraps are separated from each other by the first slot 8 and additional slots 23 as well as by the cuts 3 and 5 of the annular wall 1.

An important advantage of the aforediscussed step of deforming the circular blank in the direction (arrow I in FIG. 1) at right angles to the plane of the blank is that such deformation results in a flow of metallic material and plastic deformation involving the flow of crystals of the material of the blank transversely of the circumferential direction of the annular wall 1. Thus, the main direction of deformation (arrow I) is parallel to the axis of the annular wall 1 or, otherwise stated, parallel to the rotational symmetry axis of the finished brake band B.

The selection of a particular procedure to carry out the deforming step will depend on a number of factors, e.g., on the availability of machinery and others. As mentioned above, the deforming step can be carried out by resorting to deep drawing under a combination of tensile and compressive conditions or by resorting exclusively to forming (such as extrusion) under compressive conditions.

Cold forming is preferred because it strengthens the material of the annular wall 1 and renders it possible to dispense (if desired) with a heating step, i.e., with a thermal treatment which was considered necessary in accordance with heretofore known methods. The absence of a heating step contributes to simplicity and lower cost of the improved method.

It has been found that the aforediscussed deforming step renders it possible to increase the basic strength of the starting material by up to and even well in excess of 50 percent.

The making of a cup-shaped preform has been found to constitute a highly advantageous deforming step which enhances the quality of the annular wall 1 and renders it possible to trim the one and/or the other axial end of the annular wall in a simple and inexpensive manner. This results in the provision of a relatively short hollow cylinder which is open at both axial ends and constitutes the annular wall 1 of FIG. 3. Attenuation of the annular wall 1 in order to convert it into the member 1 of FIG. 3 also contributes to a qualitative improvement of the annular wall and, as mentioned hereinbefore, can result in calibration which is sufficient to obviate any separate calibrating step. The thickness reducing step can be carried out by stretching or expanding or pulling without a hold down device to ensure that the thickness of the initially formed annular wall 1 is reduced to an optimal value, e.g., to a thickness corresponding to that of the original circular blank and of the bottom wall 2. If a calibrating step (upon completion of the thickness-reducing step) is still necessary or advisable, such step can involve calibration of a portion of or the entire internal surface of the wall 1. For example, the calibrating step can involve bringing about a flow of the material of the wall 1 along its internal surface. If the calibrating tool (e.g., a ram) is designed in such a way that it can simultaneously perform a stamping or separating operation, separation of the bottom wall 2 from the respective axial end of the annular wall 1 can be carried out simultaneously with the calibrating and/or thickness reducing step. The other axial end of the annular wall 1 can be trimmed (if necessary) in a separate step. However, the improved method also contemplates calibrating the wall 1 in a separate step, e.g., subsequent to separation of the bottom wall 2.

The annular wall 1 can be provided with several substantially U-shaped cuts 3 and with more than two substantially L-shaped cuts 5, depending on the nature of the ultimate product.

Trimming of at least one axial end of the annular wall 1 can be carried out by radial stamping in a suitable machine in a plurality of stages. The stepwise or stagewise stamping operation at the one and/or the other axial end of the annular wall 1 can proceed radially outwardly, i.e., from the internal surface toward the external surface of the wall 1. The trimming of the one and/or the other axial end of the wall 1 can take place simultaneously with the making of the slots 8 and/or with the making of additional slots between the slots 8 and the cuts 3, 5 and 5.

An advantage of separating the web 17 of the composite actuating element 14 from the arms 15, 15 and 16 subsequent to bonding of these arms to the respective tongues (106, 106 and 104) of the annular wall 1 is that the one-piece element 14 facilitates highly accurate positioning of the arms 15, 15 and 16 relative to the respective tongues prior to the actual bonding step. Such accurate positioning is further facilitated by the locating members 13 and 18 regardless of whether the members 13 are male locating members and the members 18 are female locating members or vice versa. The severing step is carried out thereafter (preferably by resorting to one or more beams of corpuscular radiation) to separate the web 17 from the arms 15, 15 and 16, i.e., from the discrete actuating elements of the finished band B. Moreover, such mode of applying the discrete actuating elements does not affect the stability of the annular wall 1 which remains intact and is actually strengthened by the discrete actuating elements which are bonded to its tongues 104, 106, 106. The bonding of the element 14 to the annular wall 1 preferably precedes the making of the slits or slots 23, i.e., weakening of the wall 1 as a result of the making of such slits or slots follows the application of the three discrete actuating elements to the wall 1.

Bonding of the element 14 to the wall 1 can involve resistance welding using pressure, e.g., a welding technique known as projection welding. Such welding operation necessitates the application of alternating current of high strength and low potential. The just described welding technique can be applied in lieu of the aforediscussed stored energy welding. Certain other known welding techniques can be resorted to with equal or similar advantage.

Slitting of the brake lining 22 (at 122) prior to bonding to the internal surface of the annular wall 1 is preferred but not absolutely necessary. Such slitting of the brake lining can or could take place simultaneously with the making of slits 23.

The utilization of a severing apparatus which operates with one or more laser beams or electron beams to make the slits 23 is desirable and advantageous because apparatus of such character are capable of forming extremely narrow slits 23, i.e., the internal surface of the brake lining 22 within the annular wall 1 remains practically intact and its area is large. The width of the slits 23 can be selected with a view to ensure that the ultimate product (band B) can be applied and disengaged from a clutch drum or brake drum without any or with minimal friction.

Separation of the web 17 from the arms 15, 15 and 16 of the element 14 subsequent to bonding of these arms to the respective tongues of the wall 1 can be carried out by resorting to one or more beams of corpuscular radiation or in a stamping, punching or like machine. Such separation of the web 17 preferably takes place subsequent to the step of making the slits 23. The arrangement may be such that the web 17 is separated from the three discrete actuating elements or arms 15, 15 and 16 along a first line between the axially extending legs 7 of the L-shaped cuts 5 and along a second line including the axially extending portion of the U-shaped cut 3 between the circumferentially extending legs 4.

The improved method is susceptible of numerous additional modifications without departing from the spirit of the invention. For example, it is possible to combine any one of several different deforming steps (conversion of blanks into preforms A or directly into annular walls 1) with any one of several different transforming steps (conversion of the wall 1 into a portion of the multiple wrap brake band B). Furthermore, the element 14 need not be made from the separated bottom wall 2, or such element can be formed simultaneously with separation of the bottom wall 2 from the annular wall 1 of the preform. In addition, at least some of the steps or combinations of steps (less than the totality of steps necessary to make the multiple wrap brake band B) can be said to constitute novel and improved methods per se. The method is not limited to the making of multiple wrap brake bands.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of making a tubular portion of a brake band, comprising the steps of locating a blank of sheet steel in a predetermined plane; and deforming the thus located blank in a direction at right angles to said plane.

2. The method of claim 1, wherein said deforming step comprises deep drawing the blank.

3. The method of claim 1, wherein said deforming step comprises extruding the blank.

4. The method of claim 1, wherein said deforming step comprises cold forming the blank.

5. The method of claim 1, wherein said deforming step comprises converting the blank into a cup-shaped preform with an annular wall and a bottom wall, and transforming the preform into the tubular portion including separating the bottom wall from the annular wall.

6. The method of claim 5, further comprising the step of cutting the blank out of a web of sheet steel, said transforming step further including imparting to the annular wall a predetermined thickness.

7. The method of claim 1, further comprising the step of calibrating the tubular portion from within.

8. The method of claim 7, wherein said calibrating step takes place simultaneously with said deforming step.

9. The method of claim 1, wherein said deforming step comprises converting the blank into a cup-shaped preform with an annular wall having a first axial end and a second axial end and a bottom wall of one piece with one axial end of the annular wall, and separating the bottom wall from the annular wall at the one axial end.

10. The method of claim 9, further comprising the step of calibrating the annular wall subsequent to said separating step.

11. The method of claim 9, further comprising the step of calibrating the annular wall simultaneously with said separating step.

12. The method of claim 1, wherein said deforming step comprises converting the blank into a cup-shaped preform with an annular wall and a bottom wall, separating the bottom wall from the annular wall, and transforming the annular wall into a portion of a multiple wrap brake band including providing the annular wall with substantially radially extending cuts.

13. The method of claim 12, wherein said providing step comprises forming the annular wall with a substantially U-shaped first cut and with two substantially L-shaped second cuts.

14. The method of claim 13, wherein each second cut has a first leg extending axially of the annular wall and a second leg extending circumferentially of the annular wall, the annular wall having first and second axial ends and one of the first legs extending from the first toward the second axial end and the other of the first legs extending from the second toward the first axial end, the second legs of the second cuts extending from the respective first legs in a direction away from the first cut.

15. The method of claim 14, wherein said transforming step further comprises providing the annular wall with circumferentially extending slots substantially diametrically opposite the first and second cuts.

16. The method of claim 15, wherein said transforming step further comprises providing the annular wall with additional slots between the cuts and the circumferentially extending slots.

17. The method of claim 1, wherein said deforming step comprises converting the blank into a preform with an annular wall having first and second axial ends and trimming at least one axial end of the preform.

18. The method of claim 17, wherein said trimming step comprises radial stamping of the annular wall at the at least one axial end thereof.

19. The method of claim 18, further comprising the step of providing the annular wall with at least one circumferentially extending slot simultaneously with said stamping step.

20. The method of claim 1, wherein said deforming step comprises converting the blank into a preform with an annular wall and providing the annular wall with a substantially U-shaped first cut and two substantially L-shaped second cuts defining with the first cut a substantially Y-shaped portion of the annular wall.

21. The method of claim 20, wherein the substantially Y-shaped portion has two first arms extending circumferentially of the annular wall and flanking the first cut, a web connecting the first arms between the first cut and the second cuts and extending substantially axially of the annular wall, and a third arm extending from the web circumferentially of the annular wall between the second cuts and away from the first arms.

22. The method of claim 21, further comprising the step of providing the web with at least one opening.

23. The method of claim 21, further comprising the step of providing the web with at least one protuberance.

24. The method of claim 1, wherein said deforming step comprises converting the blank into an annular wall and transforming the annular wall into a portion of a multiple wrap brake band including providing the annular wall with circumferentially extending confronting tongues for attachment of actuating elements of the multiple wrap brake band.

25. The method of claim 24, further comprising the steps of forming a substantially Y-shaped one-piece composite actuating element and affixing the composite actuating element to the tongues of the annular wall.

26. The method of claim 25, wherein said forming step comprises shaping a blank of sheet metal.

27. The method of claim 25, wherein said forming step comprises providing the composite actuating element with two spaced-apart first arms, with a web which connects the first arms, and with a third arm extending from the web away from the first arms, said affixing step including securing each arm to a discrete tongue of the annular wall.

28. The method of claim 27, wherein said transforming step further comprises providing the annular wall with a web between the discrete tongues for the first arms and the discrete tongue for the second arm of the composite actuating element, providing the web of the composite actuating element with male locating members and providing the web of the annular wall with complementary female locating members.

29. The method of claim 27, wherein said transforming step further comprises providing the annular wall with a web between the discrete tongues for the first arms and the discrete tongue for the second arm of the composite actuating element, providing the web of the composite actuating element with locating openings and providing the web of the annular wall with locating protuberances complementary to the locating openings.

30. The method of claim 27, wherein said step of providing the annular wall with tongues includes providing the annular wall with a U-shaped cut surrounding the tongue which is affixed to the third arm of the composite actuating element and with two substantially L-shaped cuts surrounding tongues which are affixed to discrete first arms.

31. The method of claim 25, wherein said affixing step comprises welding the composite actuating element to the tongues of the annular wall.

32. The method of claim 25, wherein said affixing step comprises soldering the composite actuating element to the tongues of the annular wall.

33. The method of claim 25, further comprising the step of providing the composite actuating element with projections, said affixing step comprising bonding the projections to the tongues of the annular wall.

34. The method of claim 33, wherein the projections are honeycomb shaped.

35. The method of claim 33, wherein said affixing step comprises bonding at least 25 percent of the composite actuating element to the tongues of the annular wall.

36. The method of claim 33, wherein said bonding step includes stored energy welding of the composite actuating element to the tongues of the annular wall.

37. The method of claim 1, wherein said deforming step comprises converting the blank into an annular wall having first and second axial ends and a bottom wall of one piece with one axial end of the annular wall, and separating the bottom wall from the one axial end of the annular wall, and further comprising the step of transforming the annular wall into a portion of a multiple wrap brake band including providing the annular wall with circumferentially extending confronting tongues, converting the bottom wall into a substantially Y-shaped composite actuating element of the multiple wrap brake band, and affixing the composite actuating element to the tongues of the annular wall.

38. The method of claim 1, wherein said deforming step comprises converting the blank into a preform with an annular wall having internal and external surfaces, and applying a brake lining to the internal surface of the annular wall.

39. The method of claim 38, further comprising the steps of transforming the annular wall into a portion of a multiple wrap brake band including providing the annular wall and the brake lining with slots extending circumferentially of the annular wall.

40. The method of claim 1, wherein said deforming step comprises converting the blank into a preform with an annular wall, and further comprising the step of transforming the annular wall into a portion of a double wrap brake band including slitting the annular wall between the wraps of said portion of the double wrap brake band.

41. The method of claim 40, wherein said slitting step comprises severing the annular wall with at least one beam of corpuscular radiation.

42. The method of claim 41, wherein said transforming step further comprises providing the annular wall with a U-shaped cut having two legs extending circumferentially of the annular wall and with two L-shaped cuts each having one leg extending circumferentially of the annular wall, said severing step including severing the annular wall between one leg of the U-shaped cut and one leg of one of the L-shaped cuts as well as between the other leg of the U-shaped cut and the one leg of the other of the L-shaped cuts.

43. The method of claim 41, further comprising the step of providing the annular wall with circumferentially extending slots prior to said severing step, said severing step including lengthening the slots in the circumferential direction of the annular wall.

44. The method of claim 1, wherein said deforming step comprises converting the blank into a preform with an annular wall and further comprising the step of transforming the annular wall into a portion of a multiple wrap brake band including providing the annular wall with three circumferentially extending tongues, forming a substantially Y-shaped composite actuating element with three spaced apart arms and a web between the arms, bonding each arm to a different tongue of the annular wall and separating the web from the arms.

45. The method of claim 44, wherein said separating step includes separating the web by punching.

46. The method of claim 44, wherein said separating step comprises severing the composite actuating element with at least one beam of corpuscular radiation.

47. The method of claim 44, wherein said step of providing the annular wall with tongues includes providing the annular wall with a U-shaped cut having two legs extending in the circumferential direction of the annular wall and with two L-shaped cuts each having one leg extending in the circumferential direction of the annular wall, the web of the composite actuating element being located between the legs of the U-shaped cut and the legs of the L-shaped cuts.

48. A method of making a portion of a multiple wrap brake band, comprising the steps of forming an annular wall of metallic material including deforming a plane blank of sheet steel in a direction at least substantially at right angles to its plane; and slitting the annular wall in the circumferential direction thereof to form a plurality of neighboring wraps with slits between the neighboring wraps.

* * * * *